United States Patent
Togawa

[11] Patent Number: 5,134,325
[45] Date of Patent: Jul. 28, 1992

[54] CARRIAGE DRIVING APPARATUS

[75] Inventor: Tsuyoshi Togawa, Hino, Japan

[73] Assignee: Olympus Optical Co., Ltd., Tokyo, Japan

[21] Appl. No.: 665,370

[22] Filed: Mar. 6, 1991

[30] Foreign Application Priority Data

Sep. 22, 1989 [JP] Japan .................................. 1-247690

[51] Int. Cl.⁵ ............................................. H02K 41/00
[52] U.S. Cl. ........................................ 310/13; 310/12
[58] Field of Search ............................ 310/12, 13, 14; 318/315

[56] References Cited

U.S. PATENT DOCUMENTS

| | | | |
|---|---|---|---|
| 4,427,905 | 1/1984 | Sutton | 310/12 |
| 4,571,649 | 2/1986 | Goss | 310/13 |
| 4,740,946 | 4/1988 | Yumura et al. | 310/13 |
| 4,745,503 | 5/1988 | Muraoka et al. | 310/13 |
| 4,794,287 | 12/1988 | Hyuga et al. | 310/13 |

FOREIGN PATENT DOCUMENTS

| | | | |
|---|---|---|---|
| 62-75888 | 4/1987 | Japan | 310/12 |
| 62-78767 | 4/1987 | Japan | 310/12 |
| 63-181660 | 7/1988 | Japan | 310/13 |

*Primary Examiner*—Steven L. Stephan
*Assistant Examiner*—Matthew Nguyen
*Attorney, Agent, or Firm*—Frishauf, Holtz, Goodman & Woodward

[57] ABSTRACT

A carriage driving apparatus includes a voice coil type linear DC motor having a center pole, side yokes arranged on both sides of the center pole, permanent magnets respectively fixed to the side yokes to oppose the center pole, and a movable coil which has a carriage fixed thereto and can be moved forward or backward by an electromagnetic effect based on a magnetic field generated by the permanent magnets. Guide shafts are arranged on the side yokes and extending in a direction in which the carriage is moved, for supporting the carriage.

6 Claims, 3 Drawing Sheets

CARRIAGE DRIVING APPARATUS

BACKGROUND OF THE INVENTION

1. Field of the Invention

The present invention relates to a carriage driving apparatus for driving a carriage by using a voice coil type DC motor.

2. Description of the Related Art

An information recording/reproducing apparatus for recording and reproducing information by using a recording medium, such as an optical card, includes a carriage designed to reciprocate with an optical card mounted thereon. An optical head is arranged to oppose the optical card mounted on this carriage. The optical head is mounted on another carriage. This carriage is designed to reciprocate in directions perpendicular to the moving directions of the optical card.

FIG. 1 shows a conventional carriage driving apparatus for driving a carriage 21 on which an optical card 20 is mounted. This carriage driving apparatus comprises a voice coil type linear DC motor 30, a pair of guide shafts 22a and 22b arranged on both sides of the DC motor 30, and a carriage 21 supported between these guide shafts 22a and 22b and fixed on a movable coil (not shown).

The voice coil type linear DC motor 30 has side yokes 31a and 31b and a center pole 32. The two end portions of each of these members are coupled and held on end yokes 33a and 33b. Permanent magnets 35a and 35b are respectively fixed to the inner side surfaces of the side yokes 31a and 31b so as to oppose the center pole 32. In addition, a movable coil (not shown) is arranged to loosely surround the center pole 32. The movable coil can slide along the longitudinal direction of the center pole 32. The voice coil type linear DC motor 30 having the above-described arrangement generates a uniform magnetic flux throughout the stroke of the movable coil. When a current is supplied to the movable coil within the generated magnetic flux, the movable coil is linearly moved forward or backward.

The carriage 21 is fixed on the movable coil (not shown). The carriage 21 holds the optical card 20.

Support members 25a to 25d are respectively arranged on the front and rear portions of two sides of the voice coil type linear DC motor 30. The guide shafts 22a and 22b are fixed on these support members. The carriage 21 is slidably supported by the guide shafts 22a and 22b.

The carriage 21 (optical card 20) can be moved forward or backward by supplying a current to the movable coil (not shown).

The following problems are posed in the conventional carriage driving apparatus described above.

Since the guide shafts 22a and 22b are arranged outside the side yokes 31a and 31b, the pitch of the guide shafts is increased, resulting in an increase in size and weight of the carriage 21. This requires an increase in thrust of the voice coil type DC motor.

Published Unexamined Japanese Patent Application No. 63-181660 discloses a voice coil type linear DC motor as shown in FIG. 2. In this voice coil type linear DC motor, in order to prevent saturation of a magnetic flux near end yokes 33a and 33b and to decrease the weight of the apparatus, side yokes 31a and 31b and a center pole 32 are formed into the shapes shown in FIG. 2.

The following problem, however, is posed when a carriage driving apparatus is constituted by such a voice coil type linear DC motor.

If the carriage driving apparatus is designed such that a carriage is supported on the guide shafts through ball bearings, the ball bearings must be arranged to avoid the side yokes 31a and 31b. In this case, since the space for the ball bearings is very limited, small ball bearings must be used.

The durability of a ball bearing depends on the size. Therefore, the use of small ball bearings leads to a deterioration in reliability, thus posing another problem.

SUMMARY OF THE INVENTION

It is an object of the present invention to provide a carriage driving apparatus which is small and light itself and allows the use of ball bearings having maximum durability in a limited space without causing an increase in size and weight of a carriage.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
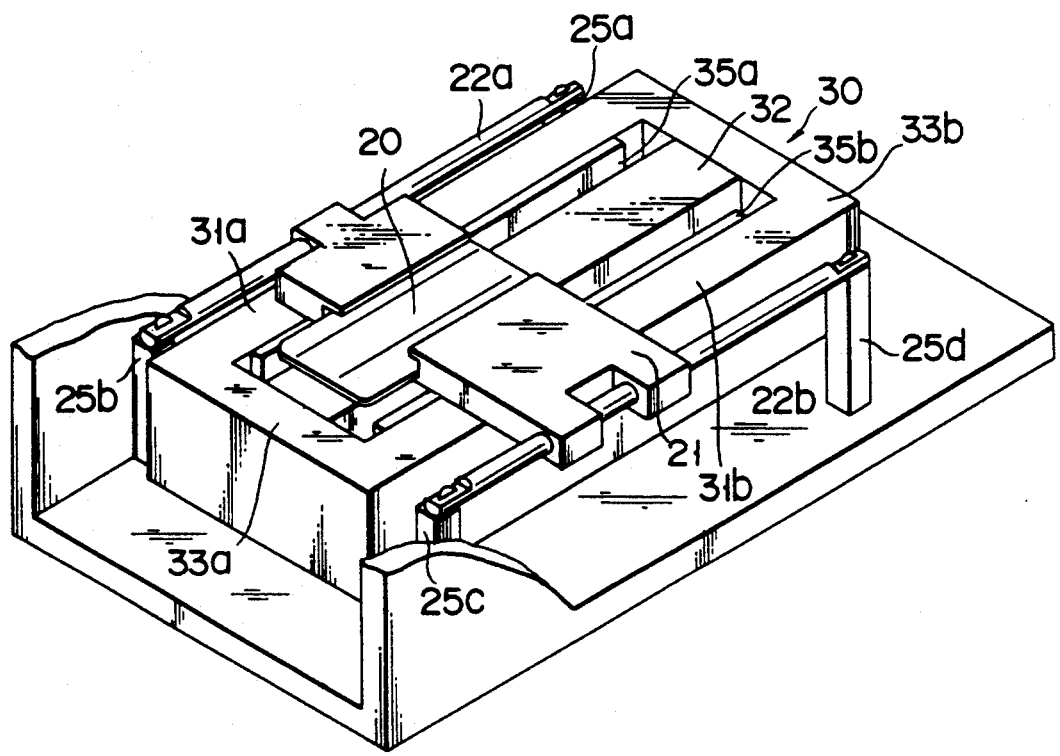
FIG. 1 is a perspective view showing a conventional carriage driving apparatus.
Figure 2:
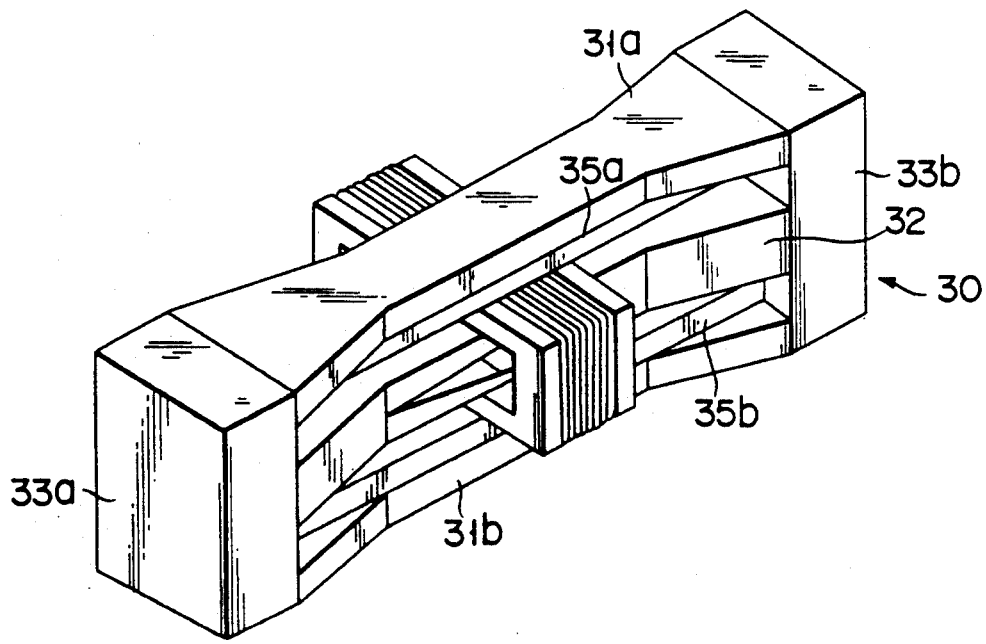
FIG. 2 is a view showing an arrangement of a conventional voice coil type linear DC motor.
Figure 3:
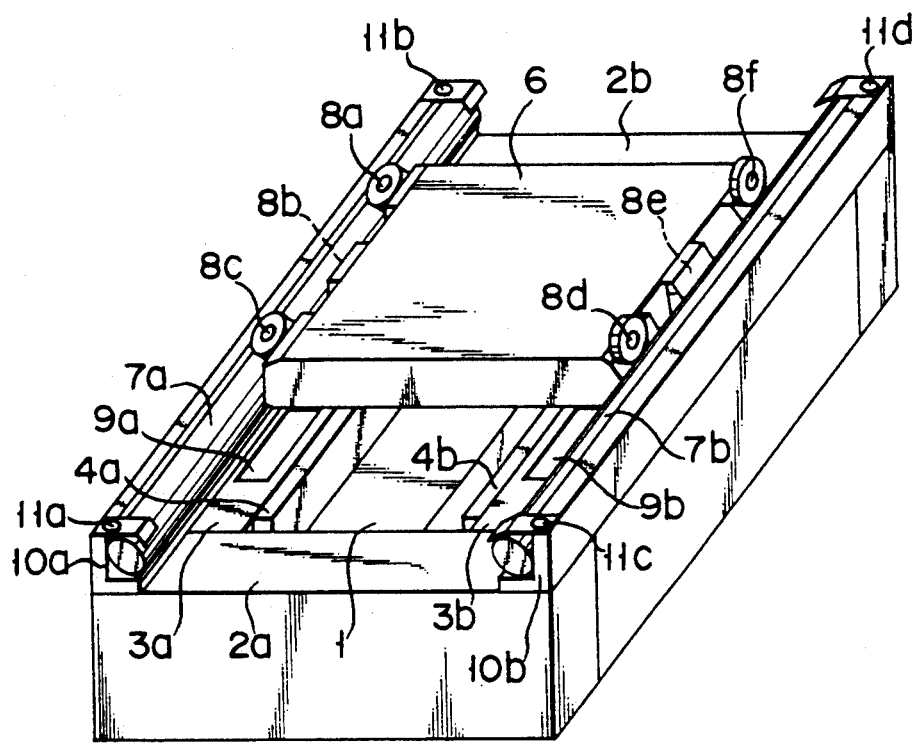
FIG. 3 is a perspective view showing a carriage driving apparatus of the present invention.
Figure 4:
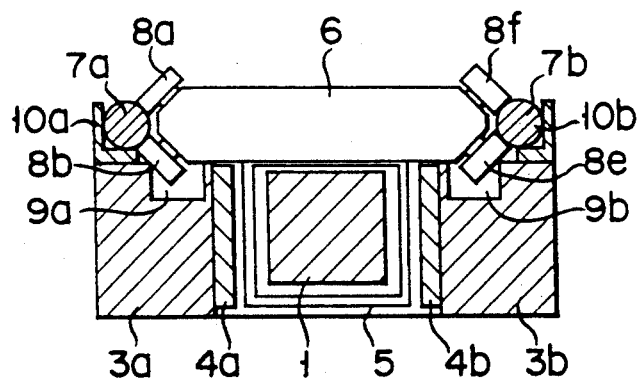
FIG. 4 is a sectional view of the carriage driving apparatus of the present invention.
Figure 5:
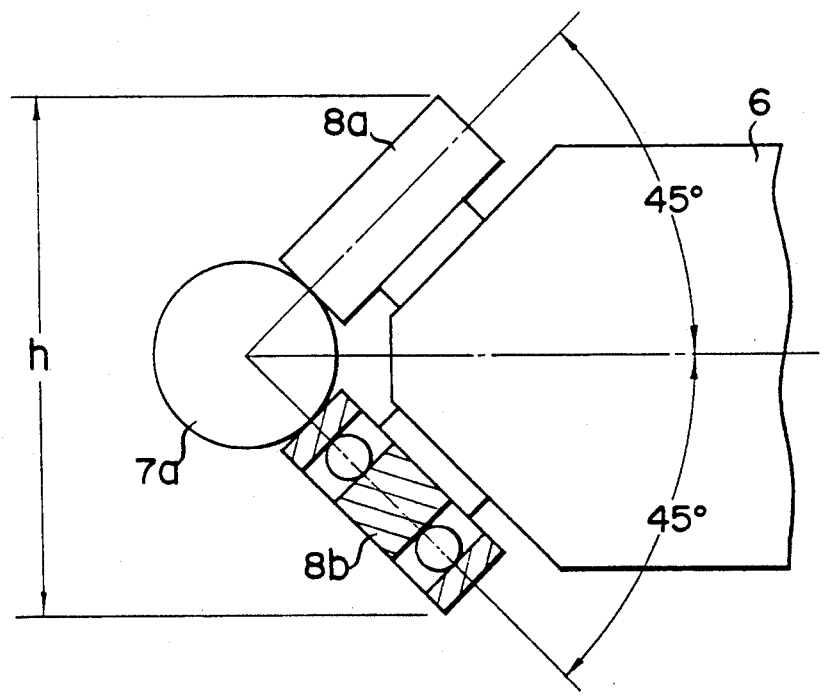
FIG. 5 is a view for explaining the durability of a ball bearing used for the carriage driving apparatus of the present invention.

A carriage driving apparatus according to an embodiment of the present invention will be described below with reference to FIGS. 3 to 5.

The carriage driving apparatus according to the present invention comprises a rectangular center pole 1 extending in the longitudinal direction of the apparatus, and rectangular side yokes 3a and 3b extending in the longitudinal direction and arranged on both sides of the center pole 1 at predetermined intervals. End yokes 2a and 2b are fixed to two end portions of each of the center pole 1 and the side yokes 3a and 3b. Permanent magnets 4a and 4b are fixed to the inner side surfaces of the side yokes 3a and 3b to oppose the center pole 1. A magnetic circuit is constituted by the end yokes 2a, 2b, the center pole 1, the side yokes 3a and 3b, and the permanent magnets 4a and 4b.

A rectangular movable coil 5 is arranged to loosely surround the center pole 1. By supplying a current to this rectangular movable coil 5, the movable coil 5 can be moved forward or backward along the center pole 1 in the longitudinal direction because of an electromagnetic effect between the magnetic circuit and the movable coil 5. With this arrangement, a voice coil type linear DC motor is realized. A carriage 6 is fixed on the movable coil 5 so that the carriage can be moved forward or backward upon movement of the movable coil 5.

L-shaped guide shaft support members 10a and 10b extending in the longitudinal direction are respectively fixed to the upper surfaces of the side yokes 3a and 3b by using screws and the like. Cylindrical guide shafts 7a and 7b extending in the longitudinal direction are mounted on these guide shaft support members 10a and 10b. The guide shafts 7a and 7b are respectively fixed at their end portions to the guide shaft support members 10a and 10b by pairs of fixing means 11a and 11b, and 11c and 11d.

Pairs of ball bearings 8a and 8c, and 8f and 8d are respectively arranged on front and rear portions of two sides of the carriage 6. The ball bearings 8a and 8c, and 8f and 8d are inclined upward so as to be in contact with the guide shafts 7a and 7b. Rotating shafts of these ball bearings are attached to the carriage 6 at an angle of about 45° with respect to, for example, the horizontal plane of the carriage 6. Ball bearings 8b and 8e are fixed to middle portions of both sides of the carriage 6. The ball bearings 8b and 8e are inclined downward so as to be in contact with the guide shafts 7a and 7b. Rotating shafts of these ball bearings 8b and 8e are attached to the carriage 6 at an angle of about 45° with respect to, for example, the horizontal plane of the carriage 6. The guide shafts 7a and 7b are clamped by these six ball bearings to be slidably supported. With this arrangement, the carriage 6 can be smoothly slid in the longitudinal direction without vibrations.

Recesses 9a and 9b extending in the longitudinal direction are respectively formed in the upper surfaces of the side yokes 3a and 3b in accordance with the positions where the two ball bearings 8b and 8e pass. The positions of the guide shafts 7a and 7b are set to be close to the magnetic circuit so that at least portions of the ball bearings 8b and 8e can be respectively fitted in the recesses 9a and 9b. As described above, the ball bearings 8b and 8e are attached to the middle portions of the two sides of the carriage 6. For this reason, the recesses 9a and 9b can be formed at positions sufficiently separated from portions near the end yokes 2a and 2b where the maximum amount of magnetic flux passes. This arrangement has no influence on the thrust of the carriage 6. In addition, the ball bearings 8b and 8e can increase in size without changing the outer dimensions of the carriage driving apparatus.

The durability of a ball bearing will be described below with reference to FIG. 5. Assume that the distance from the uppermost portion of the upper ball bearing 8a to the lowermost portion of the ball bearing 8b is given by h, when the ball bearings are attached to the carriage 6. In this case, if each ball bearing has an outer ring diameter of 4 mm and an outer ring width of 2 mm, the distance h is 11.3 mm. In contrast to this, if each ball bearing has an outer ring diameter of 7 mm and an outer ring width of 3 mm, the distance h is 16.3 mm. That is, if the recesses 9a and 9b having a size of 5 mm or more are formed in the side yokes 3a and 3b, a bearing having an outer ring diameter of 4 mm can be replaced with a bearing having an outer ring diameter of 7 mm.

The service life of a bearing is generally given by $L = (C/P)^3 \cdot a \cdot 10^6$ (L: rated service life, C: basic dynamic rated load, P: dynamic equivalent load, a: coefficient). According to the JIS, dynamic rated loads of bearings having outer ring diameters of 4 mm and 7 mm are 12 kg and 37 kg, respectively. Under the same conditions, the service life of a bearing having an outer ring diameter of 7 mm is 29 or more times longer than that of a bearing having an outer ring diameter of 4 mm.

As has been described above, according to the carriage driving apparatus of the present invention, the guide shafts are supported on the side yokes constituting the magnetic circuit. With this arrangement, the following effects can be obtained. Since the driving portion of the carriage can be formed into a unit, management and maintenance in the manufacturing process can be facilitated. Since the length of each guide shaft can be limited to the minimum required length of a stroke of the carriage, problems, such as flexure and resonance of the guide shafts, can be suppressed. Since the pitch of the guide shafts can be reduced, the carriage can be reduced in size and weight, thus allowing a high-speed carriage driving operation.

In addition, the recesses are formed in the upper surfaces of the side yokes constituting the magnetic circuit so as to allow an increase in size of the ball bearings, which support the carriage. With this increase in size, the durability of each ball bearing can be greatly increased. Furthermore, since the recesses are formed at positions sufficiently separated from the end yokes through which the maximum amount of magnetic flux passes, the magnetic circuit can be reduced in weight without influencing the thrust of the carriage. That is to say, the thickness of the carriage can be reduced without influencing the magnetic flux density.

The present invention is not limited to the embodiment described above and can be modified as follows.

In the above embodiment, the carriage 6 is movably supported by the pair of guide shafts 7a and 7b through the bearings 8a to 8f fixed to the right and left portions of the carriage 6. Instead of using the bearings 8d to 8f, a slide member may be fixed to the carriage 6 to be engaged with the guide shaft 7b. In this case, the recess 9b on the right side is not required. In addition, the number and positions of bearings to be fixed to the carriage 6 can be changed as needed.

What is claimed is:
1. A carriage driving apparatus comprising:
 a voice coil type linear DC motor including magnetic field generating means for generating a magnetic field;
 said magnetic field generating means including:
  a center pole;
  a side yoke arranged on each side of said center pole;
  said center pole and each of said side yokes respectively having first and second end portions;
  an end yoke, fixed to said first end portion of said center pole and to said first end portions of said side yokes; and
  a permanent magnet fixed to each side yoke so as to oppose said center pole;
 a movable coil which has a carriage fixed thereto, said movable coil being movable forward and backward along a path by an electromagnetic effect, based on the magnetic field generated by said magnetic field generating means;

guide means fixed to said magnetic field generating means and extending along said path along which said carriage is movable, for supporting said carriage; and moving means, attached to said carriage and engaged with said guide means, for enabling said movable coil and carriage to move along said guide means;

said moving means including a plurality of bearings; and said magnetic field generating means further including bearing passing means, arranged at a position where a thrust of the movable coil along said path is substantially free from magnetic influence, for enabling at least one of said plurality of bearings to pass therethrough.

2. An apparatus according to claim 1, wherein said bearing passing means comprises groove-like shapes in said side yokes, said groove-like shapes being shorter than said permanent magnets.

3. An apparatus according to claim 2, wherein:
said plurality of bearings are arranged on said carriage to clamp said guide shafts; and
at least one of said plurality of bearings is positioned to oppose said magnetic field generating means and is passible through said bearing passing means.

4. An apparatus according to claim 1 wherein said bearing passing means comprises grooves formed in a central portion of said side yokes, said grooves extending along said path.

5. An apparatus according to claim 1, which further comprises another end yoke fixed to said second end portions of said center pole and said side yokes.

6. The apparatus according to claim 1, wherein said guide means comprises shafts respectively fixed to said side yokes.

* * * * *

UNITED STATES PATENT AND TRADEMARK OFFICE
CERTIFICATE OF CORRECTION

PATENT NO.  : 5,134,325
DATED       : July 28, 1992
INVENTOR(S) : T. TOGAWA

It is certified that error appears in the above-identified patent and that said Letters Patent is hereby corrected as shown below:

Title page, Section [30] Foreign Application Priority Data -

Delete: "Sep. 22, 1989 [JP] Japan.....1-247690"

Signed and Sealed this

Thirty-first Day of August, 1993

Attest:

BRUCE LEHMAN

*Attesting Officer*          *Commissioner of Patents and Trademarks*